(12) United States Patent
Hwang et al.

(10) Patent No.: US 11,190,300 B2
(45) Date of Patent: Nov. 30, 2021

(54) METHOD FOR DETERMINING A TRANSPORT BLOCK SIZE AND WIRELESS DEVICE

(71) Applicant: LG Electronics Inc., Seoul (KR)

(72) Inventors: Daesung Hwang, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 147 days.

(21) Appl. No.: 16/064,964

(22) PCT Filed: Mar. 22, 2018

(86) PCT No.: PCT/KR2018/003306
§ 371 (c)(1),
(2) Date: Jun. 21, 2018

(87) PCT Pub. No.: WO2018/174564
PCT Pub. Date: Sep. 27, 2018

(65) Prior Publication Data
US 2021/0211232 A1    Jul. 8, 2021

Related U.S. Application Data

(60) Provisional application No. 62/475,843, filed on Mar. 23, 2017, provisional application No. 62/501,697, (Continued)

(51) Int. Cl.
*H04W 74/00* (2009.01)
*H04L 1/00* (2006.01)
*H04W 72/04* (2009.01)

(52) U.S. Cl.
CPC .......... *H04L 1/0091* (2013.01); *H04L 1/0004* (2013.01); *H04W 72/042* (2013.01); *H04W 72/0446* (2013.01)

(58) Field of Classification Search
CPC ... H04W 74/006; H04W 28/18; H04W 28/06; H04W 72/1268; H04W 72/042;
(Continued)

(56) References Cited

U.S. PATENT DOCUMENTS

2012/0320816 A1\* 12/2012 Kim ...................... H04L 5/0037
370/315
2013/0170469 A1\* 7/2013 Yu ........................ H04L 1/0003
370/330
(Continued)

FOREIGN PATENT DOCUMENTS

CN          101651515        2/2010
CN          103518398        1/2014
(Continued)

OTHER PUBLICATIONS

Office Action in Japanese Appln. No. 2019-517772, dated Jun. 2, 2020, 5 pages (with English translation).
(Continued)

*Primary Examiner* — Jung Liu
(74) *Attorney, Agent, or Firm* — Fish & Richardson P.C.

(57) ABSTRACT

A disclosure of this specification provides a method performed by a wireless device for determining a transport block size (TBS). The method may include the steps of determining a number of resource elements (REs) within a slot, calculating a value related to the TBS, based on the determined number of REs and a code rate, comparing the calculated value with a pre-determined threshold value, determining the TBS according to the comparison, wherein, if the calculated value is smaller than or equal to the pre-determined threshold value, the TBS may be determined using a predetermined table.

12 Claims, 7 Drawing Sheets

Related U.S. Application Data filed on May 4, 2017, provisional application No. 62/539,494, filed on Jul. 31, 2017, provisional application No. 62/555,623, filed on Sep. 7, 2017, provisional application No. 62/560,116, filed on Sep. 18, 2017, provisional application No. 62/565,046, filed on Sep. 28, 2017, provisional application No. 62/571,268, filed on Oct. 12, 2017.

(58) Field of Classification Search
CPC .... H04W 88/08; H04W 72/14; H04L 1/0018; H04L 1/0016; H04L 1/0011; H04L 5/0044; H04L 1/0007; H04L 1/0005; H04L 1/0009; H04L 5/0057; H04L 5/0053; H04L 1/0003; H04L 5/0005; H04L 5/0051; H04L 27/2627; H04L 1/0015

See application file for complete search history.

(56) References Cited

U.S. PATENT DOCUMENTS

| | | | |
|---|---|---|---|
| 2013/0343290 A1 | 12/2013 | Ren et al. | |
| 2014/0140283 A1* | 5/2014 | Jongren | H04B 7/0486 370/329 |
| 2015/0009927 A1* | 1/2015 | Larsson | H04L 27/2627 370/329 |
| 2015/0271802 A1 | 9/2015 | Kang et al. | |
| 2015/0319776 A1* | 11/2015 | Seo | H04B 7/208 370/329 |
| 2016/0234812 A1* | 8/2016 | Kim | H04W 28/06 |
| 2018/0241499 A1* | 8/2018 | Einhaus | H04L 5/0044 |
| 2019/0089511 A1* | 3/2019 | Saito | H04W 72/042 |
| 2019/0132079 A1* | 5/2019 | Saito | H04W 72/14 |

FOREIGN PATENT DOCUMENTS

| | | |
|---|---|---|
| CN | 104144029 | 11/2014 |
| EP | 3331274 | 6/2018 |
| WO | WO2017026466 | 2/2017 |

OTHER PUBLICATIONS $3^{rd}$ Generation Partnership Project; LG Electronics; "Discussion on TB size determination for NR," R1-1710325, 3GPP TSG RAN WG1, Qingdao, P.R. China, dated Jun. 2017, 2 pages.

3rd Generation Partnership Project; Technical Specification Group Radio Access Network; "Physical layer procedures for data," R1-1721344, 3GPP TS 38.214, Dec. 2017, 71 pages.

Chinese Office Action in Chinese Appln. No. 201880002957.6, dated Dec. 15, 2020, 7 pages (with English translation).

Huawei, "TBS determination for short TTI," 3GPP TSG RAN WG1 Meeting #87, R1-1611877, Nov. 18, 2016, 6 pages.

Nokia, "On details of short PDSCH design," 3GPP TSG-RAN WG1 Meeting #88, R1-1702015, Feb. 17, 2017, 7 pages.

Qualcomm Inc., "Design Details of the Shortened PDSCH," 3GPP TSG RAN WG1 #88, R1-1702566, Feb. 13, 2017, 7 pages.

Ericsson, "TBS scaling for short TTI," 3GPP TSG-RAN WG1 Meeting #88, R1-1703275, Feb. 13, 2017, 7 pages.

Ericsson, "TBS scaling for short TTI," R1-1611528, 3GPP TSG-RAN WG1 #87, Reno, USA, dated Nov. 14-18, 2016, 5 pages.

Extended European Search Report in European Application No. 18771932.3, dated Jan. 13, 2020, 10 pages.

* cited by examiner

METHOD FOR DETERMINING A TRANSPORT BLOCK SIZE AND WIRELESS DEVICE

CROSS-REFERENCE TO RELATED APPLICATIONS

This application is a National Stage application under 35 U.S.C. § 371 of International Application No. PCT/KR2018/003306, filed on Mar. 22, 2018, which claims the benefit of U.S. Provisional Application No. 62/571,268, filed on Oct. 12, 2017, U.S. Provisional Application No. 62/565,046, filed on Sep. 28, 2017, U.S. Provisional Application No. 62/560,116, filed on Sep. 18, 2017, U.S. Provisional Application No. 62/555,623, filed on Sep. 7, 2017, U.S. Provisional Application No. 62/539,494, filed on Jul. 31, 2017, U.S. Provisional Application No. 62/501,697, filed on May 4, 2017, and U.S. Provisional Application No. 62/475,843, filed on Mar. 23, 2017. The disclosures of the prior applications are incorporated by reference in their entirety.

BACKGROUND OF THE INVENTION

Field of the Invention

The present invention relates to mobile communication.

Related Art

With the success of long term evolution (LTE)/LTE-A (LTE-Advanced) for the $4^{th}$ generation mobile communication, more interest is rising to the next generation, i.e., $5^{th}$ generation (also known as 5G) mobile communication and extensive research and development are being carried out accordingly.

In the next generation mobile communication system, slots or mini-slots may be used as scheduling units in accordance with the service and/or application. In the mini-slot, time sections may be varied differently. Additionally, a number of resource elements (REs) being included in the slot or the mini-slot may be varied.

As described above, in a situation where the number of REs varies, if a transport block size (TBS) and/or a modulation coding scheme (MCS) is/are determined by using the same method as the LTE/LTE-A, since adequate measures cannot be taken for diverse situations, efficiency may be inevitably degraded.

SUMMARY OF THE INVENTION

Technical Objects

Accordingly, a disclosure of the present specification has been made in an effort to solve the aforementioned problem.

Technical Solutions

In order to achieve the aforementioned purpose, a disclosure of the present specification provides a method for determining a transport block size (TBS). The method may be performed by a wireless device and comprise: determining a number of resource elements (REs) within a slot; calculating a value related to the TBS, based on the determined number of REs and a code rate; comparing the calculated value with a pre-determined threshold value; determining the TBS according to the comparison. If the calculated value is smaller than or equal to the pre-determined threshold value, the TBS is determined using a predetermined table.

If the calculated value is greater than the pre-determined threshold value, the TBS may be determined using a mathematical function. The mathematical function may include quantizing the calculated value.

The mathematical function may include a ceiling function.

The method may further comprise: quantizing the calculated value.

The value related to the TBS may be calculated in further consideration of a modulation order and a number of layers.

The number of resource elements (REs) may be determined except for REs for a reference signal.

The TBS may be used to transmit a physical uplink shared channel (PUSCH) or receive a physical downlink shared channel (PDSCH).

In order to achieve the aforementioned purpose, a disclosure of the present specification provides a wireless device for determining a transport block size (TBS). The wireless device may comprise: a transceiver; and a processor configured to control the transceiver and to: determine a number of resource elements (REs) within a slot; calculate a value related to the TBS, based on the determined number of REs and a code rate; compare the calculated value with a pre-determined threshold value; and determine the TBS according to the comparison. If the calculated value is smaller than or equal to the pre-determined threshold value, the TBS may be determined using a predetermined table.

Effects of the Invention

According to the disclosure of the present invention, the problem of the conventional technology described above may be solved.

More specifically, according to the disclosure of this specification, depending upon the number (or size) of available REs for a downlink or uplink in the base station, a TBS and/or MCS set may be efficiently specified. Accordingly, a wireless device may efficiently select and manage a TBS and/or MCS that is/are intended to be used for an uplink transmission and a downlink reception.

DESCRIPTION OF EXEMPLARY EMBODIMENTS

Figure 1:
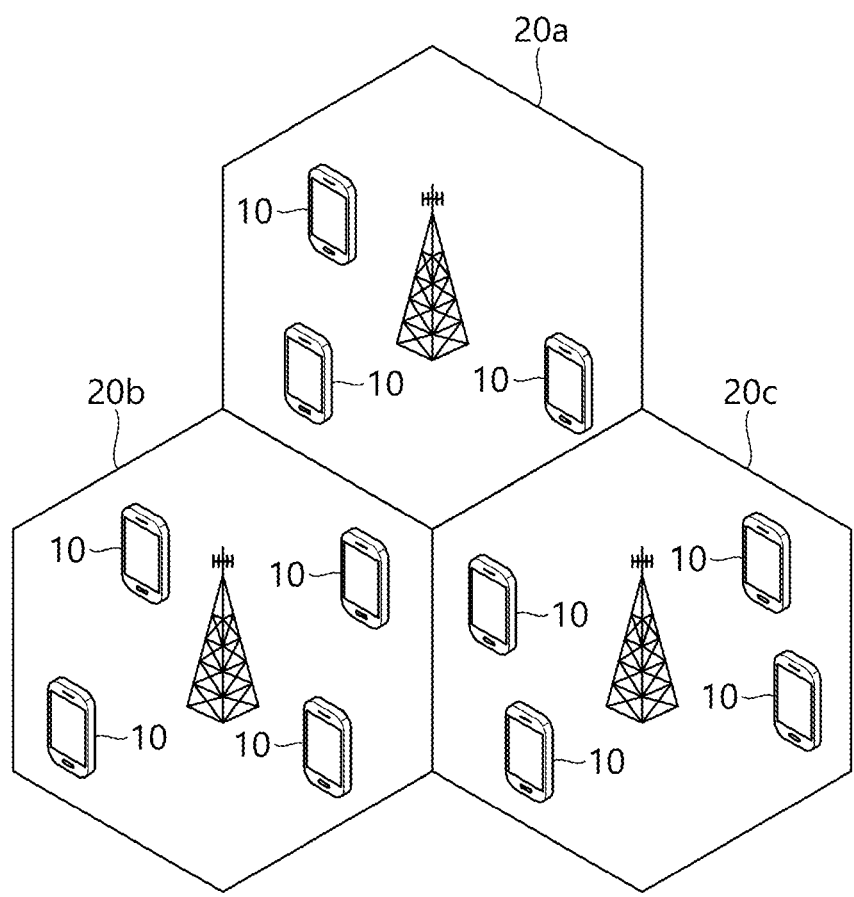
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as evolved-NodeB (eNB), base transceiver system (BTS), or access point.

As used herein, 'user equipment (UE)' may be stationary or mobile, and may be denoted by other terms such as device, wireless device, terminal, mobile station (MS), user terminal (UT), subscriber station (SS), mobile terminal (MT), and so on.

FIG. 1 illustrates a wireless communication system.

As seen with reference to FIG. 1, the wireless communication system includes at least one base station (BS) (20). Each base station (20) provides a communication service to specific geographical areas (generally, referred to as cells) (20a, 20b, and 20c). The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station (20) to the UE (10) and an uplink means communication from the UE (10) to the base station (20). In the downlink, a transmitter may be a part of the base station (20) and a receiver may be a part of the UE (10). In the uplink, the transmitter may be a part of the UE (10) and the receiver may be a part of the base station (20).

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
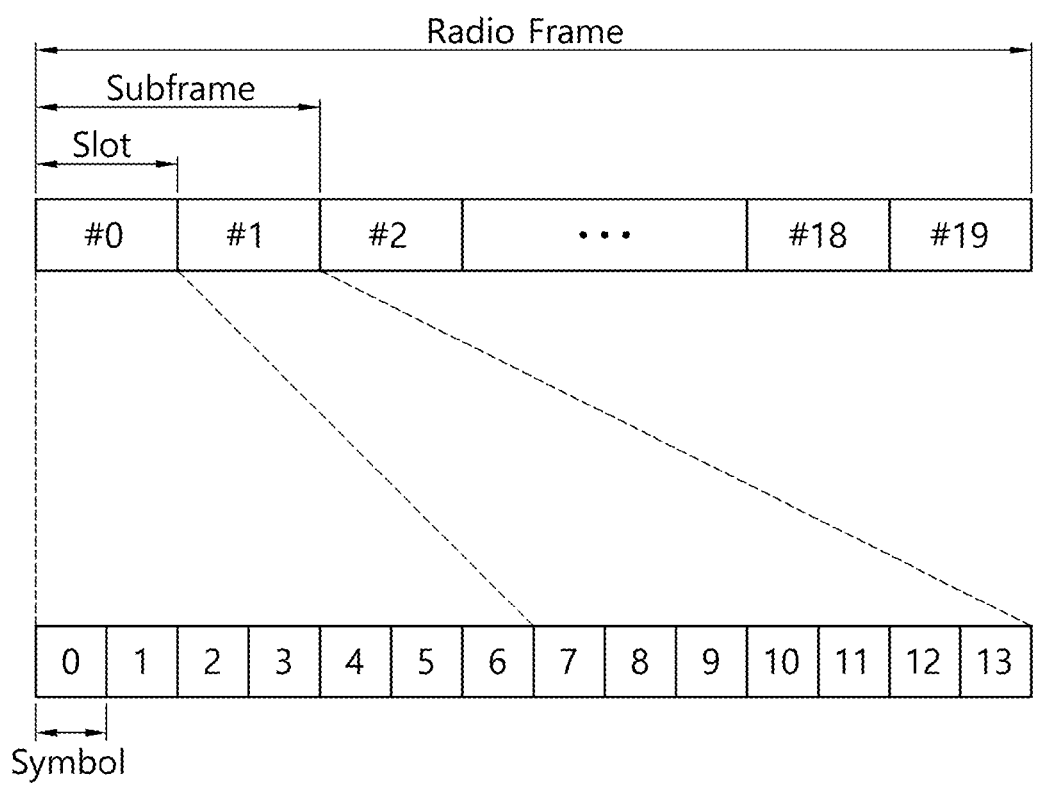
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted transmission time interval (TTI). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

One slot includes $N_{RB}$ resource blocks (RBs) in the frequency domain. For example, in the LTE system, the number of resource blocks (RBs), i.e., $N_{RB}$, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

The physical channels in 3GPP LTE may be classified into data channels such as physical downlink shared channel (PDSCH) and physical uplink shared channel (PUSCH) and control channels such as physical downlink control channel (PDCCH), physical control format indicator channel (PCFICH), physical hybrid-ARQ indicator channel (PHICH), and physical uplink control channel (PUCCH).

The uplink channels include a PUSCH, a PUCCH, a Sounding Reference Signal (SRS), and a physical random access channel (PRACH).

Figure 3:
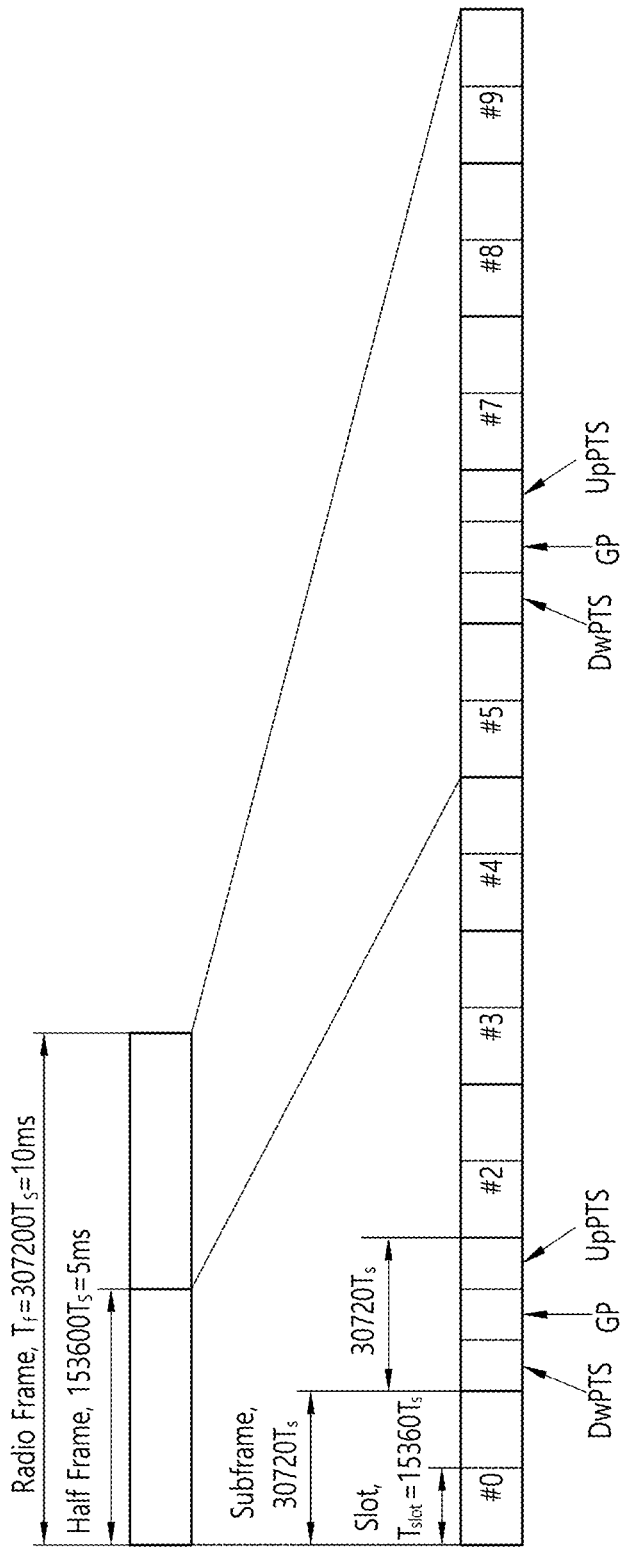
FIG. 3 illustrates a structure of a downlink radio frame according to TDD in the 3GPP LTE.

FIG. 3 illustrates the architecture of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a Downlink Pilot Time Slot (DwPTS), a Guard Period (GP) and an Uplink Pilot Time Slot (UpPTS). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a downlink (DL) sub-frame and an Uplink (UL) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<Internet of Things (IoT) Communication>

Meanwhile, IoT will hereinafter be described in detail.

IoT refers to an exchange of information between IoT devices through a base station or an exchange of information between an IoT device and a server through a base station that does not accompany or require human interaction. As described above, according to the aspect that the IoT communication is carried out through a cellular base station, IoT communication is also referred to as a Cellular Internet of Things (CIoT).

The above-described IoT corresponds to a type of Machine Type Communication (MTC). Therefore, an IoT device may also be referred to as an MTC device.

Since IoT communication has the characteristics of a small transmission data size and non-frequent occurrence of uplink or downlink data transmission/reception, it is preferable to reduce the unit price of the IoT device in accordance with its low data transmission rate and to reduce its amount of battery power consumption. Additionally, since the IoT device has low mobility, it also has the characteristic of an almost-non-varying (or hardly varying) channel environment.

As a solution for reducing the cost (or achieving low-cost) of the IoT device, regardless of a system bandwidth of the cell, the IoT device may use a subband of approximately 1.4 MHz.

The IoT communication, which operates within a bandwidth that is reduced as described above, may be referred to as Narrow Band (NB) IoT communication or NB CIoT communication.

<Next Generation Mobile Communication Network>

With the success of long term evolution (LTE)/LTE-A (LTE-Advanced) for the 4th generation mobile communication, more interest is rising to the next generation, i.e., 5th generation (also known as 5G) mobile communication and extensive research and development are being carried out accordingly.

According to the International Telecommunication Union (ITU), the fifth generation (5G) mobile communication is defined as a mobile communication technology that provides a maximum data transmission rate of 20 Gbps and a minimum experienced data rate of 100 Mbps or more in any location. The official term is 'IIMT-2020', which aims worldwide commercial usage by the year of 2020.

The ITU proposes three major usage scenarios, such as an enhanced Mobile BroadBand (eMBB), a massive Machine Type Communication (mMTC), and an Ultra Reliable and Low Latency Communications (URLLC).

The URLLC relates to a usage scenario requiring high reliability and a low latency time (or delay time). For example, services such as automated driving, factory automation, augmented reality (AR), and so on, require high reliability and a low latency time (e.g., a latency time of 1 ms or less). Statistically, the latency time of the current 4G (LTE) is within the range of 21-43 ms (best 10%) and 33-75 ms (median). This is insufficient for supporting a service that requires a latency time of 1 ms or less. The following eMBB usage scenario corresponds to a usage scenario that requires a mobile ultra-wide band.

More specifically, the $5^{th}$ generation mobile communication system aims to achieve a capacity that is greater than the current 4G LTE. The 5G mobile communication system is also capable of increasing user density for mobile wideband users and supporting Device to Device (D2D) communication, high stability, and Machine Type Communication (MTC). The 5G research and development also aims to achieve a lower latency time and lower battery power consumption as compared to the 4G mobile communication system in order to successfully implement the Internet of Things (IoT). For such 5G mobile communication, a new radio access technology (New RAT or NR) may be proposed.

In the NR, it may be considered to use a downlink (DL) subframe for the reception from the base station and to use an uplink (UL) subframe for a transmission to the base station. This may be applied to a spectrum that is formed in pairs and to a spectrum that is not formed in pairs. A spectrum pair means that two carrier spectrums are included for the downlink and uplink operations. For example, in a spectrum pair, one carrier may include a downlink band and an uplink band that is paired with the downlink band.

Figure 4:
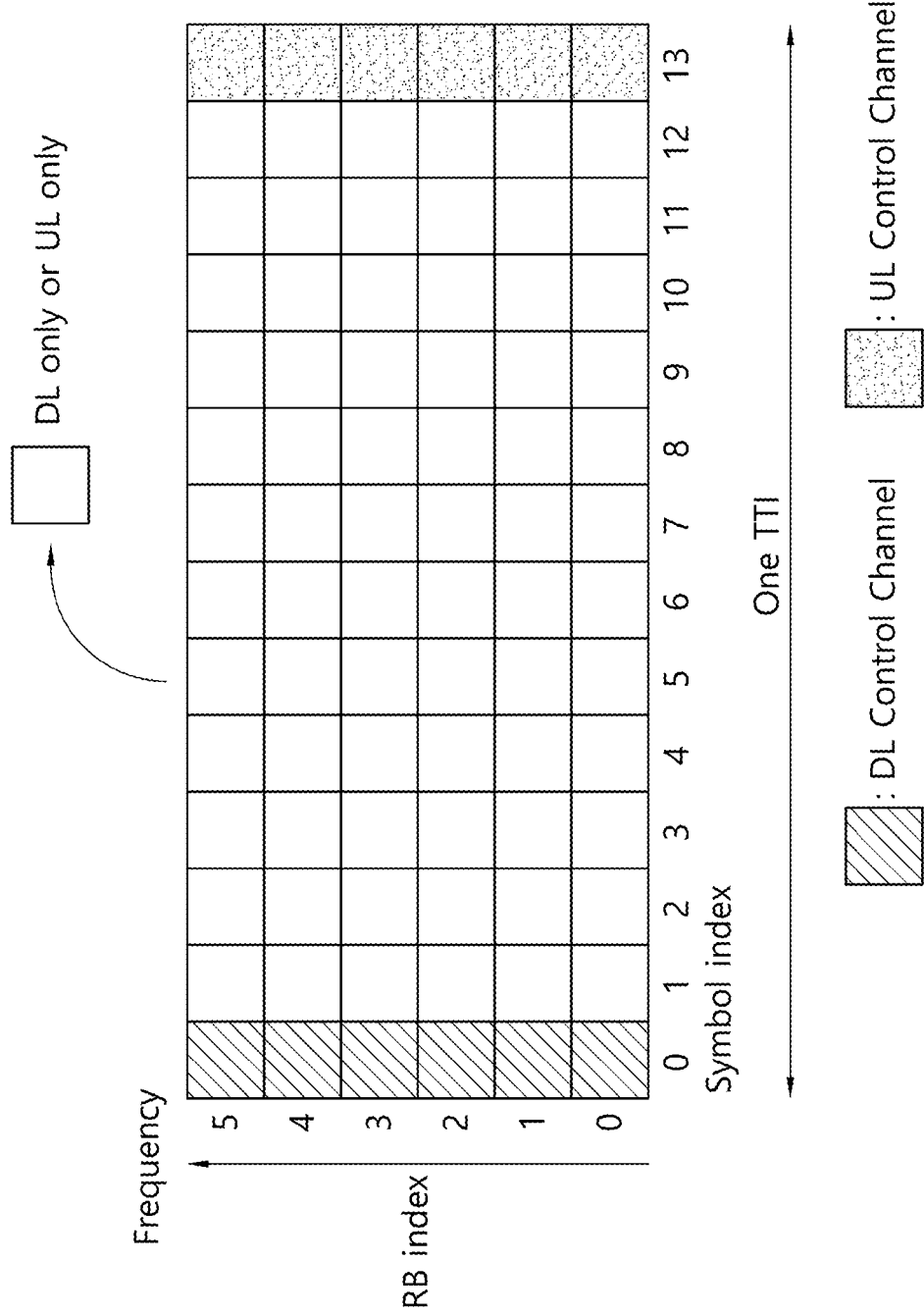
FIG. 4 shows an example of a subframe type in an NR.

FIG. 4 shows an example of a subframe type in an NR.

A transmission time interval (TTI) shown in FIG. 4 may also be referred to as a new RAT (NR). A subframe (or slot) of FIG. 4 may be used in a TDD system in a new RAT (or NR) in order to minimize data transmission latency. As shown in FIG. 4, just as the current subframe, a subframe (or slot) includes 14 symbols. Symbols located in a front part of the subframe (or slot) may be used for a DL control channel, and symbols located in a rear part of the subframe (or slot) a UL data transmission. According to the above-described subframe (or slot) structure, the downlink transmission and the uplink transmission may be sequentially performed in one subframe (or slot). Therefore, downlink data may be received in the subframe (or slot) and an uplink acknowledgement response (ACK/NACK) may be transmitted from the corresponding subframe (or slot). The above-described subframe (r slot) may also be referred to as a self-contained subframe (or slot). Using the above-described subframe (or slot) structure is advantageous in that it is capable of reducing the time that is consumed for re-transmitting data having reception error, thereby minimizing the final data transmission latency time (or waiting time). In the above-described self-contained subframe (or slot) structure, a time gap may be required during a process of shifting from a Transmission mode to a Reception mode or shifting from a Reception mode to a transmission mode. For this, in the above-described subframe structure, when shifting from a DL to a UL, part of the OFDM symbols may be configured as a Guard Period (GP).

<Support of Diverse Numerology>

In the next generation system, with the evolution of the wireless communication technology, diverse numerology may be provided to a user device (or user equipment (UE)).

Herein, the numerology may be defined by a cycle prefix (CP) length and Subcarrier Spacing. One cell may provide multiple numerologies to the UE. When the index of a numerology is indicated as μ, each subcarrier spacing and the respective CP length are as shown below in the following table.

TABLE 2

| M | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

In case of a normal CP, when the index of a numerology is indicated as μ, a number of OFDM symbols per slot ($N^{slot}_{symb}$), a number of slots per frame ($N^{frame,\mu}_{slot}$), and a number of slots per subframe ($N^{subframe,\mu}_{slot}$) are as shown below in the following table.

TABLE 3

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In case of an extended CP, when the index of a numerology is indicated as μ, a number of OFDM symbols per slot ($N^{slot}_{symb}$), a number of slots per frame ($N^{frame,\mu}_{slot}$), and a number of slots per subframe ($N^{subframe,\mu}_{slot}$) are as shown below in the following table.

TABLE 4

| μ | $N^{slot}_{symb}$ | $N^{frame,\mu}_{slot}$ | $N^{subframe,\mu}_{slot}$ |
|---|---|---|---|
| 2 | 12 | 40 | 4 |

Meanwhile, in the next generation mobile communication, each symbol within a symbol may be used for a downlink or for an uplink, as shown below in the following table. In the table show below, the uplink is indicated as U, and the downlink is indicated as D. In the following table, X represents a symbol that may be flexibly used for the uplink or the downlink.

TABLE 5

| For- | Symbol number within a slot | | | | | | | | | | | | | |
|---|---|---|---|---|---|---|---|---|---|---|---|---|---|---|
| mat | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |

TABLE 5-continued

| For-mat | \multicolumn{14}{c}{Symbol number within a slot} | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | X | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | X | X | X | X | X | U |
| 44 | D | D | D | D | D | X | X | X | X | X | X | X | U | U |
| 45 | D | D | D | D | D | X | X | U | U | U | U | U | U | U |
| 46 | D | D | D | D | D | X | D | D | D | D | D | D | D | X |
| 47 | D | D | D | D | X | X | D | D | D | D | D | X | X | X |
| 48 | D | D | X | X | X | X | D | X | X | X | X | X | X | X |
| 49 | D | X | X | X | X | X | D | X | X | X | X | X | X | X |
| 50 | X | U | U | U | U | U | X | U | U | U | U | U | U | U |
| 51 | X | X | U | U | U | U | X | X | U | U | U | U | U | U |
| 52 | X | X | X | U | U | U | X | X | X | U | U | U | U | U |
| 53 | X | X | X | X | U | U | X | X | X | X | U | U | U | U |
| 54 | D | D | D | D | X | U | D | D | D | D | D | X | U | U |
| 55 | D | D | X | U | U | U | D | D | X | U | U | U | U | U |
| 56 | D | X | U | U | U | U | D | X | U | U | U | U | U | U |
| 57 | D | D | D | X | X | X | D | D | D | D | X | X | X | U |
| 58 | D | D | X | X | U | U | D | D | X | X | U | U | U | U |
| 59 | D | X | X | U | U | U | D | X | X | U | U | U | U | U |
| 60 | D | X | X | X | X | U | D | X | X | X | X | X | X | U |
| 61 | D | D | X | X | X | X | U | D | D | X | X | X | X | U |

<Disclosure of this specification: Transport block size (TBS) calculation> In the next generation mobile communication system, slots or mini-slots may be used as scheduling units in accordance with the service and/or application. In the mini-slot, time sections may be varied differently. Additionally, a number of resource elements (REs) being included in the slot or the mini-slot may vary. More specifically, a number of time and/or frequency resource units may be varied in accordance with a size of a symbol (or a number of symbols) being included in the slot or mini-slot and/or a subcarrier spacing value, and so on. And, even for the same scheduling unit, an amount (or size) of resources that are available for usage for an actual data mapping may be time-varying in accordance with the presence or absence of a reference signal (RS) and its density, or in accordance with the presence or absence of control information and its density, and the corresponding unit may be semi-static or may be varied by a higher layer signal, or the corresponding unit may be dynamically varied (e.g., downlink control information (DCI)).

I. First Disclosure: TBS Calculation

In the next generation system, in applying TDD or FDD, a slot type (number of DLs, ULs, and gap regions, time-section, and so on) may be dynamically varied. A number of available REs (REs that are available for usage) or number of symbols per downlink or uplink within the scheduling unit (e.g., slot or mini-slot) that is given in the above-described situation may be flexibly varied. And, accordingly, a range or value of a transport block (TB) size (TBS) that is available for support/transmission may become diverse. The available RE may include a specific control signal and/or RS. Additionally, the available RE may be measured (or calculated) only for the purpose of data mapping. At this point, in case of using a method of selecting a TBS and/or modulation coding scheme (MCS) only through scheduling, since adequate measures cannot be taken for the diverse situations, efficiency may be inevitably degraded. In a situation where different available REs exist, in the aspect of using resources when performing scheduling, it may be efficient to determine different TBS and/or MCS sets.

A solution for configuring a TBS and/or MCS or a corresponding set may be configured by using one of the following methods or by using a combination of the following methods.

Solution 1: A super set may be configured for a TBS and/or MCS that can be applied to a situation where diverse available REs exist. The available RE may include a specific control signal and/or RS. Alternatively, the available RE may be measured (or calculated) only for the purpose of data mapping. In case of performing scheduling through a specific DCI, a TBS and/or MCS may be selected for a subset of the entire (or whole) super set. For example, a TBS and/or MCS selecting factor within a subset may be included in the DCI along with a factor indicating the corresponding subset. Alternatively, the subset itself may be indicated through a higher layer or a higher layer signal or may be indicated through a third DCI (e.g., a group shared DCI), and a DCI that is used for scheduling may finally designate a specific TBS and/or MCS within the selected subset. In case the subset is indicated by a higher layer, the subset may be semi-statically (or semi-persistently) configured in accordance with a situation where the available REs are different from one another or in accordance with a group (or set) of situations, and the subset may be automatically configured in accordance with the change in the situation (e.g., semi-static (or semi-persistent) or dynamic). For example, the corresponding subset may be differently or independently configured for each situation (or case) or for each set of situations, such as a case where scheduling is performed in slot units, a case where the scheduling is performed in mini-slot units, a case where a difference in the number of DLs or ULs within a specific section (e.g., slot) is equal to or greater than a predetermined level, and so on. For example, for the subset, this may correspond to a start index (or first index) and/or end index (or last index) for the TBS and/or MCS and/or a number of indexes and/or a step size (or unit size) between the indexes.

Solution 2: For a situation where diverse available REs exist, a TBS and/or MCS set (or table) may each be configured (or may be configured for a set (or group) of available RE situations). The available RE may include a specific control signal and/or RS. Alternatively, the available RE may be measured (or calculated) only for the purpose of data mapping. In case of performing scheduling through a specific DCI, the TBS and/or MCS may be selected for a specific single set. For example, a TBS and/or MCS selecting factor within a subset may be included in the DCI along with a factor indicating the corresponding subset, and the TBS and/or MCS may be finally indicated based on the information. Alternatively, the specific subset itself may be indicated through a higher layer (e.g., a higher layer signal) or may be indicated through a third DCI (e.g., a group shared DCI), and a DCI that is used for scheduling may finally designate a specific TBS and/or MCS within the subset. In case the subset is indicated by a higher layer, the subset may be semi-statically (or semi-persistently) configured in accordance with a situation where the available REs are different from one another or in accordance with a group (or set) of such situations, and the set may be automatically varied (or changed) in accordance with the change in the situation (e.g., semi-static (or semi-persistent) or dynamic). For example, the corresponding set may be differently or independently configured for each situation (or case) or for each set of situations, such as a case where scheduling is performed in slot units, a case where the scheduling is performed in mini-slot units, a case where a difference in the number of DLs or ULs within a specific section (e.g., slot) is equal to or greater than a predetermined level, and so on. For example, for the subset, this may correspond to a start index (or first index) and/or end index (or last index) for the TBS and/or MCS and/or a number of indexes and/or a step size (or unit size) between the indexes.

Solution 3: One set for the TBS and/or MCS may exist based on a specific available RE situation. More specifically, the reference set may be configured for a specific slot and/or a specific mini-slot. For the (other) situations where the available RE is changed (e.g., a change in a dynamic RS density, or a change in the slot type in the TDD/FDD), a scaling factor may be applied when configuring the TBS and/or MCS. The available RE may include a specific control signal and/or RS. The available RE may be measured (or calculated) only for the purpose of data mapping. For example, for the application of a scaling factor, a method of performing direct application for the TBS and/or MCS may be used. More specifically, when the TBS that is indicated by the DCI is given as N, based on (or considering) the scaling factor, e.g., alpha, a final TBS may be extracted from alpha*N (e.g., changing to an integer value through flooring or ceiling or rounding or specifying a specific TBS value). When referring to a reference number of PRBs during a process of obtaining the TBS by using another method, a scaling factor may be applied to the corresponding reference PRB. When it is said that reference is made to a number of PRBs that are authorized to be used for determining the TBS, the TBS value may be determined based on a value that can be extracted from alpha*N based on (or considering) the scaling factor, e.g., alpha, for the number of PRBs M (e.g., the value may be changed to an integer value through flooring or ceiling or rounding or may be specified as a specific number of PRBs candidate value). More characteristically, the scaling factor may be configured by the base station through a DCI or a higher layer. More specifically, information on a scaling factor and information on the TBS and/or MCS may be included in the DCI. In this case, the wireless device may select a final TBS and/or MCS while collectively considering the information mentioned above. Alternatively, the scaling factor may be configured through a group-shared DCI or a higher layer. More specifically, in case of performing indication through the higher layer (e.g., higher layer signal), the scaling factor may be semi-statically (or semi-persistently) configured in accordance with a situation where the available REs are different from one another or in accordance with a group (or set) of such situations, or the scaling factor may be automatically configured in accordance with the change in the situation (e.g., semi-static (or semi-persistent) or dynamic).

As described above, in case the information on the scaling factor is included in the DCI, as formats that are fixed in advance, the corresponding candidate values may be indicated in the form of percentages (%), such as 90%, 80%, . . . , and so on. Alternatively, the candidate values for the scaling factor may be configured through a higher layer signal, and, among the configured candidate values, the DCI may indicate a specific scaling factor value. The candidate value may be indicated through a higher layer signal (per multiple available RE situation, slot or mini-slot, or slot type). In this case, the actual scaling factor that is being indicated through the DCI may be differently applied depending upon a time point at which the corresponding DCI is being transmitted or a time point at which the PDSCH or PUSCH that is scheduled by the DCI is being transmitted.

Solution 4: The TBS and/or MCS may be determined based on a code rate and/or a data transmission speed (or data rate) and/or a modulation order and/or a number of layers. For example, the code rate or the data transmission speed (or data rate) may be included in the DCI, which schedules the PDSCH or PUSCH. Therefore, the wireless device may perform a final selection of the TBS and/or MCS based on the corresponding code rate or data transmission speed (or data rate) and the number of available REs within the assigned time-frequency resource. As another method, the code rate and/or the data transmission speed (or data rate) may be configured based on information that is indicated by a scheduling DCI and/or limited buffer rate-matching (LBRM). More specifically, a value of the code rate may be updated based on a RE that is used for an actual data mapping among the available REs. Additionally, the code rate may also be updated based on LBRM. The available RE may include a specific control signal and/or RS. Alternatively, the available RE may be measured (or calculated) only for the purpose of data mapping. Alternatively, the specific signal (e.g., a combination of SS block, CSI-RS, and so on) may be included when calculating the available RE. However, in this case, the control signal and/or the RS may be excluded. More characteristically, the MCS may express the modulation order, the code rate or the data transmission speed (or data rate), and the TBS may perform a final extraction of an actual TBS value in accordance with the available RE (e.g., by converting the value to an integer value by using flooring or ceiling or rounding or by specifying the value as a specific TBS candidate value).

More specifically, the number of REs that are available for usage (i.e., the number of available REs) may be configured as (1) a total number of REs being expressed by a resource assignment field regardless of the rate-matched part, or (2) a number of REs being used only for actual data mapping including the DMRS, among the REs being assigned for PDSCH/PUSCH, or (3) a number of REs being used only for actual data mapping excluding the DMRS, among the REs being assigned for PDSCH/PUSCH. More specifically, in case of the PUSCH, when calculating the available REs, REs having the UCI mapped or piggy-backed thereto may be excluded. Herein, the UCI may correspond to all UCI types, and, alternatively, the calculation of the available REs may also vary in accordance with the UCI type or a method by which the UCI is mapped to the PUSCH (rate matching or puncturing). As a more detailed example, when calculating the TBS for the PUSCH, in performing the calculation of the available REs, for the rate-matched UCI or CSI, the respective REs may be excluded from the available REs, and for the punctured UCI or HARQ-ACK, the respective REs may still be included in the available REs. However, this is merely an exemplary embodiment, and, therefore, it will be apparent that this specification may also be extendedly applied to an inversed method.

In the next generation system, quantization may be performed on the number of available REs, and, by calculating the TBS of an intermediate step by using the quantized result, it may be advantageous for a scheduler of the base station to adjust (or control) the TBS. Essentially, the value for the quantization may be differently configured/designated for the DL and the UL. More detailed examples for configuring the number of available REs are described below.

Example 1: Calculation is performed based on the total REs (e.g., 12*number of assigned symbols) within the PRB excluding the overhead for the DMRS. More specifically, the scheduled symbols may be limited to a specific value (e.g., 14, 12, 10, 7, 4, 2, and so on). Additionally, the overhead for the DMRS may be determined based on a specific DMRS configuration. For example, the overhead for the DMRS may be determined based on a case where the number of DMRS REs is the greatest (in accordance with the TM, number of ports, and so on, that are configured in light of the corresponding UE), or the overhead of the DMRS may be determined based on a method (a higher layer signal and/or DCI indication method) indicated by the base station. Even more specifically, additional DMRS may be excluded. This is to be capable of supporting the same TBS regardless of the difference in the usage or non-usage of the additional DMRS between the initial transmission and the re-transmission. At this point, an exemplary method of expressing the reference number of REs may correspond to 8*K1+12*K2. Herein, K1 may represent a number of symbols including the DMRS, and K2 may include a number of the remaining scheduled symbols. The value of 8 may vary depending upon the DMRS configuration or pattern.

Example 2: The reference number of REs may also be calculated by using a method of excluding an overhead of a specific signal (e.g., DMRS) for a RE corresponding to one symbol within the PRB, converting the processed result to an integer (by using a ceiling function or a flooring function or a rounding function, and so on), and then multiplying the converted integer by the number of scheduled symbols. For example, in case the scheduled symbols correspond to N, the reference number of REs may correspond to N, 2N, 3N, . . . , 12N. More specifically, the scheduled symbols may be limited to a specific value (e.g., 14, 12, 10, 7, 4, 2, and so on, or a combination of subsets).

Example 3: The base station may, for example, configure a reference number of sets by using a RRC signal and/or DCI. The reference number of sets may also differ depending upon a group of scheduled symbols. More specifically, the types of the reference number of sets may vary depending upon an overhead assumption. For example, it may be assumed that (1) only the DMRS overhead is excluded from the number of specific scheduled REs, and/or (2) the overhead of a Synchronization Signal Block (SSB) is excluded, or (3) the overhead of a rate-matching resource (RMR) that is to be rate-matched (e.g., Control Resource Set (CORE-SET)) is excluded.

Example 4: The set configuration for the reference number of REs may be configured of a number of uniform steps. For example, this may correspond to a multiple of 8. This may be represented as a number of REs that can be data mapped in a symbol including the DMRS within the PRB.

In relation to the above-described methods, when selecting the TBS and/or MCS, the wireless device may be configured by a plurality of methods or by a combination of such methods. More specifically, the applied method(s) may vary depending upon the number of available REs or factors of the available REs (e.g., a change in the amount (or size) of the time-domain resource or a change in the amount (or size) of the frequency-domain resource). Alternatively, the configuration method may also be selected in accordance with the determination (or decision) (e.g., DCI signaling, or higher layer signaling) of the base station. According to another exemplary embodiment, the TBS and/or MCS may be configured based on a scaling factor along with a code rate and/or a data transmission speed (or data rate) and/or a modulation order. More specifically, the information on the code rate or data transmission speed (or data rate) may be included in the DCI, which schedules the PDSCH or PUSCH. Alternatively, the code rate or data transmission speed (or data rate) may be configured based on information being included in the DCI for scheduling and/or limited buffer rate-matching (LBRM). More specifically, the value of the code rate may be updated based on the RE that is used for actual data mapping among the available REs. Additionally, the code rate may also be updated based on LBRM. The scaling factor may be indicated by the base station (e.g., through a higher layer signal and/or DCI). Additionally, a value of the scaling factor may be configured in accordance with available REs and/or a number of aggregated slots and/or a number of assigned PRBs. In the above-described situation, the UE may perform a final selection of the TBS and/or MCS based on the corresponding code rate or data transmission seed (or data rate) and the number of available REs within the assigned time-frequency resource. This method may be advantageous in a case where the base station directly indicates a TBS to the UE when the available REs are changed during the performance of the initial transmission and the re-transmission. For example, the scaling factor and/or code rate may be adjusted (or controlled) in order to indicate the same TBS during the initial transmission and the re-transmission despite the change in the available REs.

II. Second Disclosure: Reference Number of REs

As another solution (or method) for indicating the same TBS between an initial transmission and a re-transmission, candidates for the reference number of REs per slot/mini-slot or per PRB may be indicated through a higher layer signal. And, among the candidates, one may be indicated through the DCI. In the next generation system, as another method for performing indication through the DCI, an adequate reference number may be selected from the available REs, which are calculated in accordance with the resource assignment, and so on, by using the ceiling function or the flooring function or the rounding function, and so on. More specifically, the candidates for the reference number of REs per slot/mini-slot or per PRB may be interconnected with the resource assignment information. More specifically, the value range for the available REs within a slot/mini-slot may vary in accordance with the time-domain resource assignment. Therefore, the reference number of REs per slot/mini-slot or per PRB may be configured in accordance with the number of symbols or a group of a number of symbols being indicated or scheduled by the resource assignment. Alternatively, in case of the time-domain resource assignment, the time-domain resource that are available through higher layer signaling may be limited. The reference number of REs per slot/mini-slot or per PRB may be calculated in accordance with each status value for the corresponding time-domain resource assignment or the reference number of REs may be jointly (or commonly) configured when performing the time-domain resource assignment. For example, in a specific state, in case a number of symbols being marked (or indicated) by a start symbol index and an end symbol index is equal to N, the reference number of REs per slot/mini-slot or per PRB may be configured by multiplying the number of subcarriers within the PRB by N. More specifically, among candidates of the reference number of REs per slot/mini-slot or per PRB being configured through the higher layer signal, part of the candidates may be configured regardless of the scheduled resource (e.g., a number of scheduled symbols that can be varied (or changed) by a time domain RA). And, herein, other specific candidate(s) may be varied (or changed) in accordance with the scheduled resource (e.g., a number of scheduled symbols that can be varied (or changed) by a time domain RA). This method is advantageous in that, as the resource that is scheduled for the initial transmission is varied (or changed), this method is capable of supporting a flexible change (or variation) in the range of TBS values while considering spectral efficiency while configuring a specific candidate value that is capable of supporting the same TBS even in a situation where the scheduled resource is changed between the initial transmission and the re-transmission regardless of the change in the scheduled resource. As another method, values for the reference number of REs or a set of such values for a slot-based scheduling and a non-slot based scheduling may be differently (independently) configured/performed. More specifically, in case of the slot-based scheduling, it may be understood that a range of change (or variation) in the scheduled resources for the time domain is relatively small. Therefore, the candidates for the reference number of REs per slot or per PRB may be configured regardless of the scheduled resources. Conversely, in case of the non-slot based scheduling, since the range of change (or variation) in the scheduled resources for the time domain may be relatively large, the candidates for the reference number of REs per slot or per PRB may be configured independently to those for the slot. More specifically, the candidates for the reference number of REs per mini-slot or per PRB may be independently configured for the number of scheduled symbols or for each group of such symbols.

Even when performing a Code Block Group (CBG)-based (re-)transmission, another method for indicating the same TBS between the initial transmission and the re-transmission may be needed. The difference in the number of available REs between the initial transmission and the re-transmission may be large, and, accordingly, a scaling factor that can compensate for such difference may be required. For example, when performing the CBG-based re-transmission, as only part of the CBGs are transmitted, among the entire CBGs, for the re-transmission, a situation where the frequency-domain resource becomes relatively smaller and/or the time-domain resource becomes relatively smaller may occur. In the situation where the time-domain resource becomes relatively smaller, support may be provided by using a method of indicating the reference number of REs per slot/mini-slot or per PRB that are independent to the scheduled resources. However, in the situation where the frequency-domain resource becomes relatively smaller, a separate processing set may be required.

Generally, it may be understood that the number of available REs is (approximately) proportional to the number of CBGs that are being (re-)transmitted. And, therefore, it may be needed to use such number of available REs. More specifically, when performing TBS calculation, the reference number of REs may be scaled down by using a total number of CBGs and/or a number of CBGS that are indicated for re-transmission as the corresponding parameter. When performing the TBS calculation, the process may be extended to use a separate scaling factor. For example, in case the total number of CBGs is equal to P, and the number of CBGs that are indicated for the re-transmission is equal to Q, a process of additionally multiplying Q/P or P/Q may be performed in the equation for calculating the reference TBS or TBS. Alternatively, in configuring the reference number of REs per slot/mini-slot or per PRB, a scaling factor or a set of scaling factors between the TB-based scheduling (scheduling DCI wherein all CBGs are indicated) and the CBG-based scheduling (scheduling DCI wherein part of the CBGs are indicated) may be independently configured, and, herein, the P/Q value may be multiplied thereto. More specifically, in case the CBG based scheduling is configured (e.g., a case where CBGTI field is configured to the DCI), the above-described method may be applied. Alternatively, based on the actual scheduling information, the TB-based scheduling and the CBG-based scheduling may be separately handled.

In light of the reference number of REs per slot/mini-slot or per PRB that is used for the above-described purpose of determining the TBS, the operation methods prior to the RRC configuration process and/or during the RRC reconfiguration process need to be defined. For example, the reference number of REs may be required to be known even when scheduling the remaining minimum system information (RMSI), and, for simplicity, a pre-defined value may be used. For example, the corresponding reference number of REs per slot/mini-slot or per PRB may be determined by using the CORESET section for the RMSI and the RS configuration (e.g., overhead of the RS according the usage of a wideband RS and/or DMRS) as the parameters. More specifically, the CORESET section may be assumed to be equal to 2 or 3, and the DMRS may be assumed to be equal to 1/M. This, the number of available REs that can be used for the PDSCH mapping may be counted. Alternatively, the reference number of REs for the PDSCH or PUSCH may be indicated through the PBCH. More specifically, in case of transmitting a third message (i.e., MSG 3) of the random access procedure for the PUSCH, the reference number of REs may be indicated in an uplink grant (UL grant) being included in a random access response (RAR). More specifically, in a situation where a fallback mode is operated, the PDSCH or PUSCH may correspond to a PDSCH or PUSCH that is being scheduled to a specific DCI (e.g., DCI corresponding to a specific format and/or a specific CORESET (e.g., to which the RMSI is scheduled)).

III. Third Disclosure

In the next generation system, a plurality of channel coding schemes (including those having different base graphs) may be used. In this case, in order to perform adequate Chase combining and incremental redundancy (IR), it is required to ensure that a coding scheme, e.g., base graph of a low-density parity-check code (LDPC), between the initial transmission and the re-transmission is maintained. More specifically, the BG may be different depending upon the code rate. And, even in a case where DCI for the initial transmission is applied, in order to ensure that the BG remains the same, it is required for the DCI to indicate the information on the BG. Detailed examples of the method for indicating the BG are described below.

Example 1: The wireless device selects a BG based on a code rate that is indicated in the DCI (by using the corresponding value itself, or by calculating an efficient code rate based on the corresponding value and the scheduled resource, and so on). In order to change the actual code rate between the initial transmission and the re-transmission, the base station may use a scaling factor. In other words, when performing BG selection a code rate indication value may be used, and, when performing an actual TBS calculation, a multiplication between the code rate and the scaling factor may be used.

Example 2: The DCI may directly indicate the used (or applied) BG for the PDCSH or PUSCH. More specifically, the BG may be indicated through an explicit indication, or the usage of a specific BG may be indicated through CRC masking of the DCI.

Example 3: When selecting the BG, the selection may be made based on a multiplication between the code rate and the modulation order. The same TBS shall be indicated between the initial transmission and the re-transmission. And, accordingly, in a situation where the code rate changes, since the modulation order may also change accordingly, in case of selecting the BG based on the corresponding multiplication, the same TBS may be efficiently expressed through scheduling configuration.

As another method, this may also be used for supporting multiple modulation orders for the same TBS. For example, the value of the scaling factor may be configured of a combination of {2, 3/2, 4/3, 1, 1/2, 2/3, 3/4, . . . }, and so on.

As yet another method, in the next generation system, in determining the TBS after selecting the MCS, the TBS may be selected in accordance with the number of available REs apart from or instead of the number of assigned PRBs (e.g., in accordance with a combination of the number of PRBs and the number of symbols or the number of REs). More specifically, the combination of the number of symbols may be configured for a combination of the number of part of the symbols (e.g., 1, 2, . . . , 7, . . . , 14 symbols) within a slot along with a combination of the number of slots (e.g., one slot, two slots, . . . ) considering a multi-slot aggregation. More specifically, a combined form of the number of slots and the number of symbols may also be taken into consideration considering the flexibility in the scheduling. The following table shows an example of a TBS configuration method for a specific MCS.

the size of code blocks (CBs) when dividing the TBS to multiple code blocks (CBs). Herein, it will be assumed that a virtual TBS (an intermediate value of a TBS calculation or an intermediate value of an information bit) is expressed as a multiplication of a code rate, a number of bits per modulated symbols, available REs (e.g., derived by using time-domain RA, frequency-domain RA, number of layers, and so on, and, more simply, this may be expressed as a multiplication between the number of symbols and the number of PRBs and the number of layers). More specifically, when the scaling factor is adopted, it may be considered that the parameter is additionally multiplied by the scaling factor. Additionally, for the purpose of considering the code rate based on the CB, it may be assumed that the middle step (or unit) TBS of the above-described calculation method is configured to include a virtual CRC (or TBS CRC and/or CB CRC). More specifically, a process of generating a virtual TBS after excluding a length of a virtual CRC may be performed before performing quantization, or, when performing the quantization, the process of adding a virtual CRC may be omitted. In other words, the virtual TBS may be considered to be quantized depending upon a specific condition. For example, when it is given that quantization is performed to a value M, the final TBS may be understood as a result of multiplying the virtual TBS/a floor( ) value or ceiling( ) value or round( ) value of M by M. Detailed examples of a method for configuring an M value or for performing TBS quantization are described below.

Example 1: The value of M may vary depending upon a virtual TBS value. For example, a number of CBs corresponding to a virtual TBS or an integer conversion value for the corresponding virtual TBS (e.g., ceiling or flooring or rounding) is calculated. When performing the CB calculation, a process of adding a virtual CRC length to a virtual TBS may be performed for simplicity. When the number of CBs is given as C, the value of M may be expressed as a multiplication between 8 and C, or the value of M may also be expressed as a least common multiple of 8 and C or as a multiple value of the least common multiple of 8 and C.

More specifically, in the next generation system, each CB may be encoded/decoded by using an LDCP code (or sign), and a format configured of a base graph (BG) having a size of Z×Z may be adopted. In this case, by additionally considering Z, the M value may be designated as a multiplication between 8 and C and Z, or the value of M may also be expressed as a least common multiple of 8 and C and Z or as a multiple value of the least common multiple of 8 and

TABLE 6

| MCS | N PRB, 1 symbol | N PRB, 2 symbols | N PRB, 4 symbols | N PRB, 8 symbols | N PRB, 1 slot | N PRB, 2 slots | N PRB, 3 slots | N PRB, 4 slots | N PRB, 5 slots |
|---|---|---|---|---|---|---|---|---|---|
| M | K | 2K | 4K | 8K | 14K | 28K | 42K | 56K | 70K |
| M + 1 | J | 2J | 4J | 8J | 14J | 28J | 42J | 56J | 70J |

Herein, it may be considered to designate a scaling factor instead of directly indicating the TBS, and, then, to extract the TBS in accordance with the corresponding scaling factor.

IV. Fourth Disclosure

In the next generation system, in light of the aspect of the TBS being basically indicated in a format for transmitting a Medium Access Control (MAC) message, the TBS may be limited to a multiple of 8. Additionally, the available TBS value may be limited as a method for uniformly matching C and Z. The value of Z may correspond to a value that is deduced from the virtual TBS.

Instead of using a deduction method from the virtual TBS, the C value and/or the Z value may be deduced in accordance with a range of a combined value of the available REs and/or the code rate and/or the modulation order, and so on. Herein, however, the deduction method or the resulting values may be extended from the scope and spirit of the present invention and may then be applied accordingly.

Example 2: The value of M may also be configured regardless of the virtual TBS. For example, the value of M may be expressed as a multiplication between 8 and the least common multiple of the possible number of CBs (e.g., 1, 2, 3, 4, . . . , N_{CB,max}, wherein N_{CB,max} corresponds to the maximum number of CBs), or the value of M may be configured as a least common multiple between one another or as a multiple value of the least common multiple between one another. In the next generation system, the coding scheme (including a scheme having a different generation matrix or parity check matrix) may vary depending upon the code rate (this may be indicated from an actual MCS, or this may correspond to an actual code rate that is configured by considering the data mapping RE and/or LBRM operations according to the RA in the indicated value). And, the maximum size of the CB may also be differently configured. In this case, the combination of the possible number of CBs or the maximum number of CBs may be different. And, accordingly, the value of M may be differently configured in accordance with at least the coding scheme.

More specifically, in the next generation system, each CB may be encoded/decoded by using an LDCP code (or sign), and a format configured of a base graph (BG) having a size of Z×Z may be adopted. In the above-described case, by additionally considering Z, the calculated M value may then be multiplied by an additionally possible Z value or by a least common multiple between the Z values, or the M value may be updated by calculating a least common multiple between the calculated M value and the calculated least common multiple between the possible Z values.

Example 3: The value of M may vary depending upon a virtual TBS value. For example, a number of CBs corresponding to a virtual TBS or an integer conversion value for the corresponding virtual TBS (e.g., ceiling or flooring or rounding) is calculated. When performing the CB calculation, a process of adding a virtual CRC length to a virtual TBS may be performed for simplicity. When the number of CBs is given as C, the value of M may be expressed as a multiplication between 8 and C! (=C*(C−1)*(C−2)* . . . *1), or the value of M may also be expressed as a least common multiple of 8 and C! or as a multiple value of the least common multiple of 8 and C!. As another method, the value of M may be expressed as a multiplication between 8 and LCM (C, C−1, C−2, . . . , 1), or the value of M may also be expressed as a least common multiple of 8 and LCM (C, C−1, C−2, . . . , 1) or as a multiple value of the least common multiple of 8 and LCM (C, C−1, C−2, . . . , 1) (herein, LCM corresponds to a least common multiple value). In case of this method, maintaining a large difference between the TBS values as the TBS increases or as the value of C increases may be advantageous for limiting the expressible TBS values.

More specifically, in the next generation system, each CB may be encoded/decoded by using an LDCP code (or sign), and a format configured of a base graph (BG) having a size of Z×Z may be adopted. In the above-described case, by additionally considering Z, the M value may be designated as a multiplication between 8 and C! or LCM (C, C−1, . . . , 1) and Z, or the M value may be designated as a least common multiple of the 8, C! or LCM (C, C−1, . . . , 1, and Z values or as a multiple value of the least common multiple of the 8, C! or LCM (C, C−1, . . . , 1, and Z values. The Z value may correspond to a value that is deduced from the virtual TBS.

Instead of using a deduction method from the virtual TBS, the C value and/or the Z value may be deduced in accordance with a range of a combined value of the available REs and/or the code rate and/or the modulation order, and so on. Herein, however, the deduction method or the resulting values may be extended from the scope and spirit of the present invention and may then be applied accordingly.

Example 4: The value of M may be configured regardless of the virtual TBS. The value of M may be indicated by the base station to the UE. For example, the value of M may, more specifically, be indicated through a higher layer signal and/or DCI. In case of using the higher layer signal, the value of M may be independently configured per channel coding scheme (including BGs being different from one another).

In addition to the above-described method, in supporting diverse TBSs, the TBS may also be limited while considering the size of a parity check matrix or generation matrix in order to minimize operations, such as shortening, usage of a filter bit, extending, puncturing, and so on, by using the characteristics of channel coding. More specifically, when it is given that the LDPC coding is used, the TBS may be configured to be equal to a multiple of 22 for a specific BG in accordance with the BGs that are being used, and additional configuration may be made so that the TBS can be equal to a multiple of 10 for another BG. As described above, in extracting the TBS value, when performing a quantization process, in case the size between the CBs, which are used later on, is uniformly matched, the size may be required to be defined in accordance with a situation where a CRC is actually being added. Accordingly, when extracting the TBS, after performing quantization of an added sum of the TBS and CRC (e.g., TB CRC and/or CB CRC), the final TBS may then exclude the CRC (e.g., TB CRC and/or CB CRC). According to an exemplary embodiment, the TBS may be expressed by using the Equation format shown below.

$$TBS = M \times \left\lfloor \frac{\text{virtual } TBS + CRC_{TB} + CRC_{CB} \times C}{M} \right\rfloor - (CRC_{TB} + CRC_{CB} \times C) \qquad \text{[Equation 1]}$$

Herein, M represents a quantization level, and $CRC\_TB$ indicates a CRC length of a TB, and $CRC\_CB$ represents a CRC length of a CB, and C represents a number of CBs. Herein, the virtual TBS may be configured of a combination of the number of available REs (number of layers and/or number of time-frequency resources, and so on), the code rate, the scaling factor, and so on.

V. Fifth Disclosure

Apart from the quantization process, in case of the TBS, a TBS having a specific value that is required in accordance with a specific application (e.g., VoIP, and so on) of the TBS may be required to be supported. In the next generation system, when configuring the TBS, in case the operation is performed based on an equation, a case where it is difficult to configure a specific TBS value in accordance with a variable available RE and/or code rate, and so on, may occur. Alternatively, in order to ensure (or secure) the corresponding TBS, the resource assignment may be limited. More detailed examples of a method for selecting a special TBS will be described below.

Example 1: When performing TBS calculation, it may be considered to additionally use a scaling factor that is indicated in the DCI. And, herein, the scaling factor may generally be used for relatively increasing or decreasing the TBS value for the same number of available REs and/or code rate. When the DCI indicates a specific value or state of the scaling factor, instead of referring to the TBS equation, it may be considered to use a specific TBS value or to estimate the TBS value from a specific table. For example, the possible value of the scaling factor may correspond to a table format such as {1, ⅔, ⅓}. When the indication is made by a table, the TBS may be extracted from a pre-defined table or a table that is configured by the base station, instead of using the TBS equation. The table allows the TBS to be extracted in accordance with the available REs and/or PRB assignment and/or MCS, and so on.

Example 2: In case the value of the virtual TBS is equal to or less than a specific threshold value, or in case a number of virtual CBs (a calculated value of the CB using a virtual TBS) is equal to or less than a specific threshold value, a TBS configuration that is based on a table instead of the TBS equation is performed. Thereafter, the table may once again allow the TBS to be extracted in accordance with the available REs and/or PRB assignment and/or MCS, and so on.

Example 3: A specific TBS may be indicated through a specific field of the DCI. More specifically, when the modulation order is configured (or set) to 2 or QPSK, and/or the assigned PRB is configured to a specific value, and/or the time-domain RA is configured to a specific value, and/or the available REs are configured to a specific value or a range of specific values, and/or the value of the MCS is configured to a specific value or less, a specific TBS that satisfies the corresponding condition may be selected.

Example 4: The application may be differentiated by an RNTI, and the TBS configuration method may vary depending upon the RNTI value corresponding to the DCI, which schedules the PDSCH or PUSCH. In other words, the base station may configure whether to perform the TBS configuration method per RNTI based on an equation or whether to perform the TBS configuration method per RNTI based on a table. For example, in case of an SPS-C-RNTRI, a table-based TBS extraction method may be performed, and, in case of a C-RNTI, an equation-based TBS extraction method may be performed.

The TBS having a specific value may be selected/configured by using one of the above-described method or by using a combination of the above-described methods.

As another method of quantization, a method of first obtaining the virtual TBS and then matching a final TBS from a reference TBS table may be considered. The following exemplary embodiment corresponds to an exemplary embodiment of a method for generating a reference TBS table. In case of carrying out encoding by using LDPC coding, a virtual CBS+CRC size (which is indicated as K) that is included in one CB may be given a value of $22*Zc$ or $10*Zc$ in accordance with the BS. Among the values corresponding to the following table, depending upon the BG, $Zc*22 \geq$ actual CBS or $Zc*(10$ or $9$ or $8$ or $6) \geq$ actual CBS may be selected as the Zc. Herein, the virtual CBS corresponds to a value that is obtained by multiplying the Zc by 22 or 10, and, it will be assumed that padding, and so on, is applied to an actual CBS. In case of the actual CBS, this value may be obtained when the TBS is segmented to a number of segments corresponding to the number of CBs.

TABLE 7

| Set index ($i_{LS}$) | Set (Z) of lifting size |
| --- | --- |
| 1 | {2, 4, 8, 16, 32, 64, 128, 256} |
| 2 | {3, 6, 12, 24, 48, 96, 192, 384} |
| 3 | {5, 10, 20, 40, 80, 160, 320} |

TABLE 7-continued

| Set index ($i_{LS}$) | Set (Z) of lifting size |
| --- | --- |
| 4 | {7, 14, 28, 56, 112, 224} |
| 5 | {9, 18, 36, 72, 144, 288} |
| 6 | {11, 22, 44, 88, 176, 352} |
| 7 | {13, 26, 52, 104, 208} |
| 8 | {15, 30, 60, 120, 240} |

In case the number of CBs=1, in case of the TBS, in order to reduce padding, it will be preferable that the TBS is divided by 22 or divided by 10 depending upon the code rate.

In order to support this, 22 or 10 may be quantized in accordance with the code rate, and a multiplication between 22 or 10 and a Zc value may become a basic TBS set.

For example, in case of using BG1, the basic TBS may be as shown below.

TABLE 8

| Index | TBS |
| --- | --- |
| #CB = 1 | 72, 160, 248, 336, 424, 512, 600, 688, 776, 864, 952, 1040, 1128, 1216, 1304, 1392, 1568, 1744, 1920, 2096, 2272, 2448, 2624, 2800, 3152, 3504, 3848, 4200, 4552, 4904, 5256, 5608, 6312, 7016, 7720, 8424 |

When needed, the table presented above may be down-selected as part of the TBS, or part may be extended.—In case the number of CBs>1

Valid TBS when (The TBS is only valid when Zc>191=8424/2/22, and the valid TBS corresponds to a TBS wherein $Zc*22$ or $10*2$ is valid (in this case, if the CRC is to be excluded, the CRC may be excluded).)

Even when CB=K, a valid TBS may be obtained by using a similar method.

TABLE 9

| Index | TBS |
| --- | --- |
| #CB = 2 | 9080, 9784, 10488, 11192, 12600, 14008, 15416, 16824 |
| #CB = 3 | 18912, 21024, 23136, 25248 |
| #CB = 4 | 28040, 30856, 33672 |
| #CB = 5 | 35056, 38576, 42096 |
| #CB = 6 | 46296, 50520 |
| #CB = 7 | 54016, 58944 |
| #CB = 8 | 61736, 67368 |
| #CB = 9 | 69456, 75792 |
| #CB = 10 | 77176, 84216 |
| #CB = 11 | 84896, 92640 |
| #CB = 12 | 101064 |
| #CB = 13 | 109488 |
| #CB = 14 | 117912 |
| ... | ... |
| #CB = K | $8448*K - 24*(K + 1)$ |

When needed, the table presented above may be down-selected as part of the TBS, or part may be extended. Meanwhile, a TBS table may be configured by gathering each of the valid TBSs.

A reference function may be obtained by using a function, and a TBS that is most approximate to the reference TBS may be found in the TBS table. The corresponding TBS may be greater than the reference TBS while corresponding to the smallest number, or may correspond to a most approximate number, or may be smaller than the reference TBS while corresponding to the greatest number.

In case of BG2, when selecting the Z value or generating the parity check matrix, a format wherein a filter bit is included in the CB size (including the CRC) may be considered, and, in this case, the TBS may be generated so that the added amount (or size) or frequency of usage of the filter bit can be minimized. And/Or, a difference value between the TBS values may be limited to a non-decreasing value as the TBS value increases. The following corresponds to an exemplary embodiment of TBS in a case where the number of CBs is equal to 1.

TABLE 10

| Index | TBS |
|---|---|
| #CB = 1 | 8, 32, 56, 80, 104, 128, 152, 176, 200, 224, 248, 272, 296, 320, 344, 368, 392, 416, 440, 464, 488, 512, 536, 560, 664, 784, 904, 1024, 1144, 1264, 1384, 1504, 1624, 1744, 1864, 1984, 2104, 2224, 2344, 2464, 2584, 2704, 2824, 2944, 3064, 3184, 3304, 3424, 3544, 3664, 3824 |

At this point, when needed, the table presented above may be down-selected as part of the TBS, or part may be extended. The above-described details may be extendedly applied to a code block group (CBG). As a more detailed example, a number of CBGs may be configured (by the base station to the wireless device) for a specific time-frequency resource. More specifically, for a slot including N number of symbols, N number or M number of CBGs may be included in one slot. The slot type (wherein the numbers of DL, UL, and gap portions or time duration are diversely configured) may be dynamically changed. In this case, a number of available REs (REs that are available for usage) or number of symbols per downlink or uplink within the scheduling unit (e.g., slot or mini-slot) that is given in the above-described situation may be flexibly varied. And, accordingly, the number of CBGs may also vary. Additionally, a case where TB is mapped for each slot through a multi-slot aggregation, and so on (including a case where a single TB is repeated) may be considered, and a case where a single TB is mapped to a plurality of slots may also be considered. The number of CGBs may be configured by using one of the following methods or by using a combination of the methods described below.

Solution 1: In configuring the number of CBGs, the number of CBGs may be configured for each slot type or for a multi-slot aggregation information (e.g., number of slots and/or TB mapping method) through each higher layer signal. Alternatively, the number of CBGs may also be configured in accordance with a number of available REs. For example, the number of CBGs may also be configured for each number of symbols corresponding to the scheduling unit (or step) or for each time-frequency resource unit. In this case, the number of CBGs may be automatically varied (or changed) in accordance with a change in the available REs or the number of symbols. Alternatively, the number of CBGs may also be determined in the form of a table in accordance with the number of available REs or symbols for each MCS. The following table shows an example for configuring the number of CBGs.

Unlike the table, which is presented above, a number of layers and/or a number of PRBs and/or a number of RGBs may also be additionally considered. The corresponding number of available symbols may, for example, exclude reserved resources, a UCI region, and so on, and, in case mapping is not accurately performed in the table, a smallest number being greater than the corresponding number of available symbols may be selected (e.g., in case the number of symbols is equal to 7, 8 symbols are selected). Solution 2: The number of CBGs may be configured through (a scheduling DCI or a higher layer signal) regardless of the slot type or scheduling unit (or step). In this case, the number of symbols corresponding to the CBG may be varied.

Solution 3: The number of CBGs may be configured through (a scheduling DCI or a higher layer signal) with reference to a specific slot type and/or a scheduling unit (or step). As the actual scheduling unit and/or number of symbols and/or amount (or size) of the time-frequency resource vary, the number of CBGs may be varied in proportion to the corresponding reference standard. For example, if the number of CBGs is configured to be equal to N for one slot, in case of a multi-slot aggregation situation including 2 slots, the number of CBGs may be increased to 2N. This may be understood as a method of implicitly generating the table of Solution 1. And, in case the value is smaller than the reference scheduling unit, a scaling factor may be applied, and, in case the value is greater, a multiple of the corresponding value may be obtained.

More specifically, even in case of using Solution 1, a maximum number of CBGs may be given. In case a value is greater than the corresponding number, Solution 2 may be applied regardless of the table or the designated value. In other words, Solution 1 or Solution 2 may be applied in accordance with the size of the scheduling unit. According to a change in the number of CBGs, the DCI size and/or HARQ-ACK codebook size may be varied accordingly. In order to avoid the above-described situation, even if the number of CBGs becomes smaller than the basic number of CBGs, the DCI size and/or HARQ-ACK codebook size may be configured as the basic number of CBGs. Conversely, if the actual number of CBGs becomes greater than the basic number of CBGs due to the multi-slot aggregation, the HARQ-ACK feedback and/or the DCI scheduling re-transmission may once again be limited to slot units. Accordingly, the HARQ-ACK codebook size and/or DCI size may be configured based on the basic CBG. In case the mapping of a specific CB overlaps with a plurality of CBGs, even if the CB corresponds to a CB being indicated to overlap using the CBG-based re-transmission, in the aspect of an actual transmission, the CB may be transmitted only once without any overlapping. Additionally, even when determining the HARQ-ACK status, an overlapping CB may cause influence on determining the HARQ-ACK status corresponding to only a specific CBG instead of causing an overlapping influence on multiple HARQ-ACK statuses.

As described above, the available REs may include REs that are available for usage in actual data mapping, and REs

TABLE 11

| MCS | 1 symbol | 2 symbols | 4 symbols | 8 symbols | 1 slot | 2 slots | 3 slots | 4 slots | 5 slots |
|---|---|---|---|---|---|---|---|---|---|
| M | K | K | K | K | K + 1 | 2K | 3K | 4K | 5K |
| M + 1 | K | K | K + 1 | K + 1 | 2K | 4K | 6K | 8K | 10K | that are used for transmitting other signals, such as a control signal or DMRS or other RSs, and so on. In order to calculate the TBS with more efficiency, a number of available REs that can be used for the actual data mapping may be considered during the process of calculating the available REs within the TBS equation. Alternatively, a number of available REs that can be used for the actual data mapping in the code rate part may also be considered. Additionally, in the next generation system, as a method for enhancing resource efficiency, it may be considered to allow PDSCH mapping to be performed within a control region. In this case, it is required to determine (or decide) whether or not to consider the corresponding region when performing the TBS calculation. Detailed examples of a method of considering a region that is available for PDSCH mapping within the control region will hereinafter be described.

Example 1: Reference is made to a time-frequency domain or number of REs to which the PDSCH is mapped within the control region when performing TBS calculation or configuration. More specifically, the number of available REs that are used for the TBS configuration may include a time-frequency domain or number of REs to which the PDSCH is mapped within the control region, and/or the time-frequency domain or number of REs to which the PDSCH is mapped within the control region may be included in a denominator of the equation for calculating an efficient code rate.

Example 2: When performing TBS calculation or configuration, a time-frequency domain or number of REs to which the PDSCH is mapped within the control region may not be taken into consideration. More specifically, the number of available REs and/or the code rate used for the TBS configuration may only be counted for a data region after the control region.

Example 3: In the next generation system, time-domain resource assignment may be performed, and, in this case, a start symbol index for the PDSCH may be semi-statically (or semi-persistently) configured or may be indicated through the DCI. In this case, it may be determined whether or not the resource having the PDSCH mapped thereto within the control region is being used for the TBS calculation/configuration in accordance with the configured PDSCH start symbol index. For example, in case the PDSCH start symbol index is configured to be smaller than a control region length (e.g., CORESET section) or configured to overlap, reference may be made to the region to which the PDSCH is mapped within the control region when performing the TBS calculation, and, otherwise, reference will not be made to the corresponding region. More specifically, the region to which the PDSCH is mapped within the control region may be considered from the PDSCH start symbol index.

Whether or not the PDSCH is being mapped within the control region and its usage may be configured in accordance with a rate-matching pattern that is indicated regardless of the PDSCH start symbol index. Alternatively, a region that is available for PDSCH mapping may be configured based on the region starting from the corresponding PDSCH start symbol index to the CORESET section and the information indicated by the rate-matching pattern, only in a case where the PDSCH start symbol index is configured to overlap with the CORESET.

VI. Sixth Disclosure

In the next generation system, in order to enhance the receiving performance for the PDSCH or PUSCH, transmission throughout a plurality of slots may be supported. As described above, although a scheduling method using a plurality of slots (i.e., an aggregation method for multiple slots) may increase the number of REs that are actually available for usage for performing PDSCH or PUSCH mapping, in order to enhance the receiving performance for the above-described purpose, it may not be adequate to use a method that also increases the TBS as much as the increase in the number of available REs. Described below are more detailed examples of a method for extracting TBS in a situation of aggregating multiple slots.

Example 1: Among the aggregated slots, only a number of available REs of a specific slot may be configured as the number of available REs that are referred to when performing TBS extraction. More specifically, among the aggregated slots, a first slot may be designated as the specific slot, or the last slot may be designated as the specific slot.

Example 2: An average value of the number of available REs for the aggregated slots may be configured as the number of available REs that are referred to when performing TBS extraction.

Example 3: Based on the number of available REs among the aggregated slots, the largest (or greatest) number or the smallest number may be configured as the number of available REs that are referred to when performing TBS extraction.

VII. Seventh Disclosure: Exemplary Implementation

The above-described first to seventh disclosures of this specification may be combined.

Figure 5:
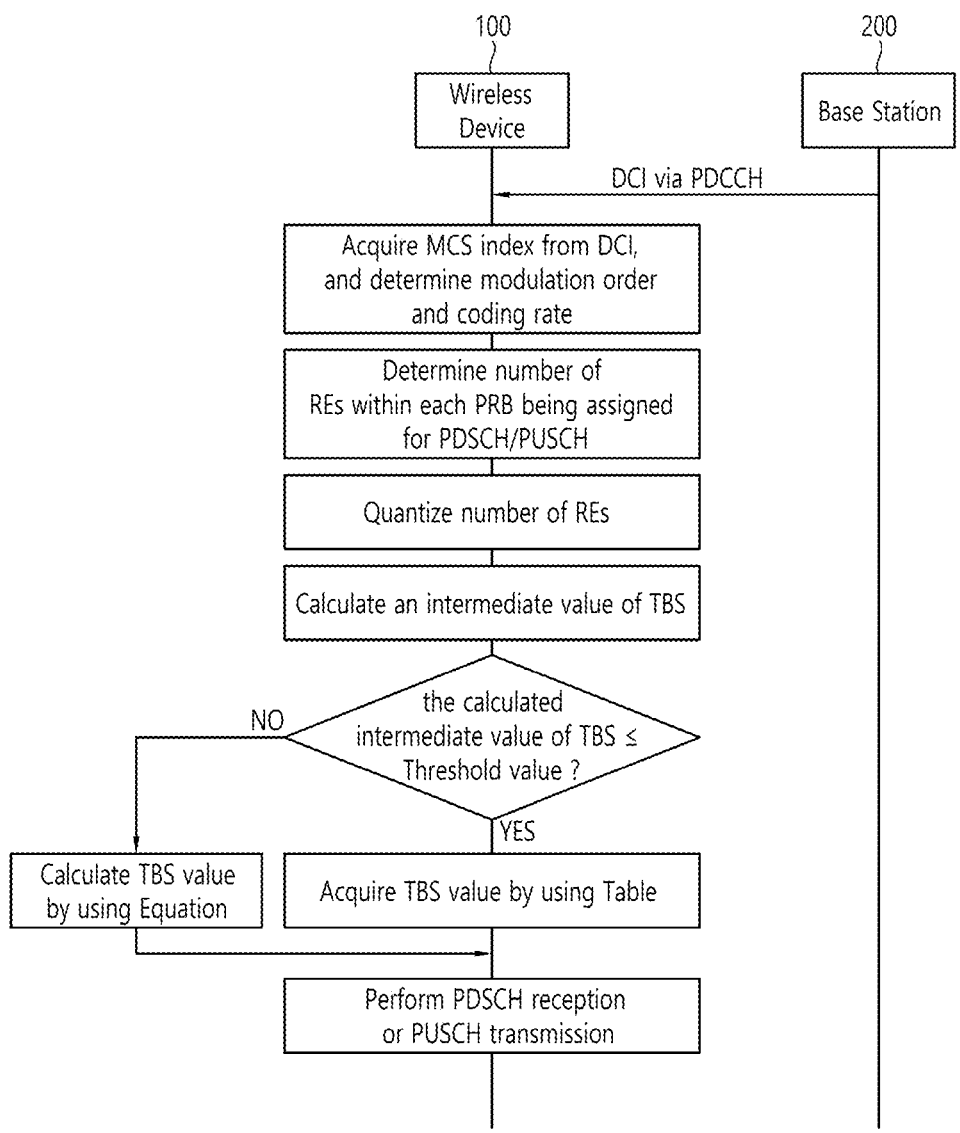
FIG. 5 is an exemplary diagram showing an implementation example according to disclosures of this specification.

FIG. 5 is an exemplary diagram showing an implementation example according to disclosures of this specification.

Referring to FIG. 5, a wireless device (100) receives a DCI through a control channel, i.e., a PDCCH.

The wireless device acquires an MCS index from the DCI and determines a modulation order and a coding rate.

And, the wireless device determines a number of REs within each PRB or each slot that is assigned for the PDSCH/PUSCH. When determining the number of REs, a reference signal (RS) for the RE may be excluded.

The wireless device quantizes the number of REs.

Thereafter, based on the quantized number of REs, the wireless device calculates an intermediate value of the TBS (or virtual TBS value). While performing the calculation of the intermediate value of the TBS (or virtual TBS value), the coding rate may be further considered. Also, while performing the calculation of the intermediate value of the TBS (or virtual TBS value), the modulation order and the number of layers may be additionally considered. Herein, the intermediate value of the TBS (or virtual TBS value) may be quantized.

The wireless device compares the intermediate value of the TBS (or virtual TBS value) with a predetermined threshold value. If the intermediate value of the TBS (or virtual TBS value) is less than or equal to the predetermined threshold value, the wireless device determines the final TBS value by using a table. However, if the intermediate value of the TBS (or virtual TBS value) is greater than the predetermined threshold value, the wireless device determines the final TBS value by using an equation. The equation may correspond to the above-described Equation 1. Herein, the equation may include flooring, ceiling, or rounding.

In the exemplary description presented above, although solutions (or methods) are described based on a flowchart including a series of steps or blocks, the disclosure of this specification will not be limited only to an order of the above-described steps. Some steps may be generated in a different order or simultaneously with the above other steps. Furthermore, it will be apparent to anyone skilled in the art that the steps included in the flowchart are not exclusive but include other steps or that one or more steps in the flowchart may be eliminated (or removed) without exerting influence on the scope and spirit of the present invention.

The above-described exemplary embodiments of the present invention may be implemented by using diverse means. For example, the exemplary embodiments of the present invention may be implemented in the form of hardware, firmware, and software, or in a combined form of any of the above. This will be described in more detail with reference to the appended drawings.

Figure 6:
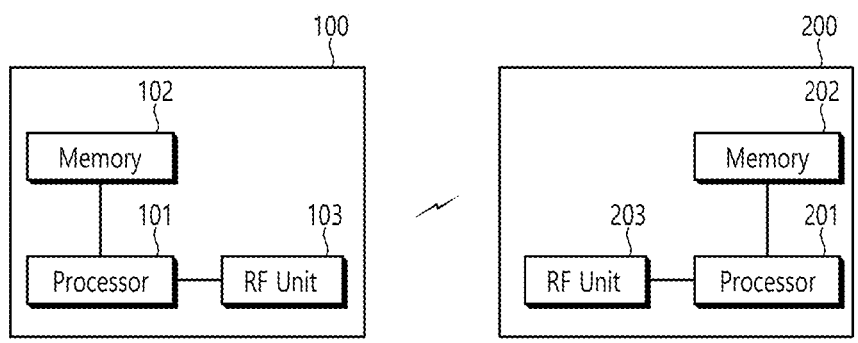
FIG. 6 is a block diagram showing a wireless device and a base station in which a disclosure of this specification is implemented.

FIG. 6 is a block diagram showing a wireless device and a base station in which a disclosure of this specification is implemented.

Referring to FIG. 6, the wireless device (100) and the base station (200) may implement the disclosure of this specification.

As shown in the drawing, the wireless device (100) includes a processor (101), a memory (102), and a transceiver (103). Similarly, as shown in the drawing, the base station (200) includes a processor (201), a memory (202), and a transceiver (203). The processors (101, 201), the memories (102, 202), and the transceivers (103, 203) may each be implemented as a separate chip or at least two or more blocks/functions may be implemented by a single chip.

The transceiver (103, 203) includes a transmitter and a receiver. In case a specific operation is being performed, any one of the transmitter and the receiver may be operated, or both the transmitter and the receiver may be operated. The transceiver (103, 203) may include one or more antennas transmitting and/or receiving radio signals. Additionally, the transceiver (103, 203) may include an amplifier that is used for amplifying a reception signal and/or a transmission signal, and a band-pass filter that is used for performing transmission to a specific frequency band.

The processor (101, 201) may implement the functions, processes, and/or methods that are proposed in this specification. The processor (101, 201) may include an encoder and a decoder. For example, the processor (101, 201) may perform the operations according to the description presented above. The above-described processor (101, 201) may include an application-specific integrated circuit (ASIC), another chip set, a logical circuit, a data processing device, and/or a converter converting a baseband signal and a radio signal to and from one another.

The memory (102, 202) may include a read-only memory (ROM), a random access memory (RAM), a flash memory, a memory card, a storage medium, and/or another storage device.

Figure 7:
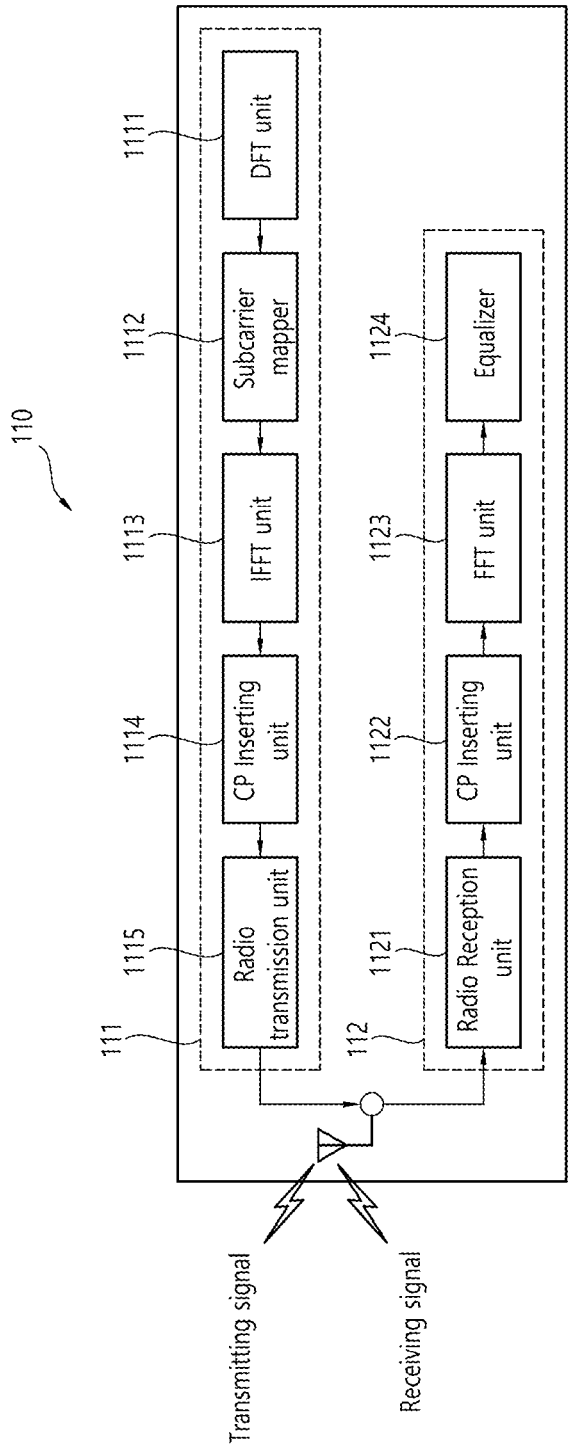
FIG. 7 is a detailed block diagram of a transceiver included in the wireless device shown in FIG. 6.

FIG. 7 is a detailed block diagram of a transceiver included in the wireless device shown in FIG. 6.

Referring to FIG. 7, the transceiver (110) includes a transmitter (111) and a receiver (112). The transmitter (111) includes a Discrete Fourier Transform (DFT) unit (1111), a subcarrier mapper (1112), an Inverse Fast Fourier Transform (IFFT) unit (1113), a CP inserter (1114), a radio transmitter (1115). The transmitter (111) may further include a modulator. Also, for example, the transmitter (111) may further include a scramble unit (not shown), a modulation mapper (not shown), a layer mapper (not shown), and a layer permutator (not shown), and these blocks may be positioned before the DFT unit (1111). More specifically, in order to prevent an increase in the peak-to-average power ratio (PAPR), the transmitter (111) allows information to pass through the DFT unit (1111) beforehand prior to mapping a signal to a subcarrier. After performing subcarrier mapping, a signal that is spread (or precoded, in the same sense) by the DFT unit (1111) through the subcarrier mapper (1112), a signal within a time axis is generated (or created) after the processed signal passes through the Inverse Fast Fourier Transform (IFFT) unit (1113).

The DFT unit (1111) performs DFT on the inputted symbols, thereby outputting complex number symbols (complex-valued symbols). For example, if Ntx symbols are inputted (wherein Ntx is an integer), a DFT size is equal to Ntx. The DFT unit (1111) may also be referred to as a transform precoder. The subcarrier mapper (1112) maps the complex number symbols to each subcarrier of the frequency domain. The complex number symbols may be mapped to resource elements corresponding to resource blocks being assigned for data transmission. The subcarrier mapper (1112) may also be referred to as a resource element mapper. The IFFT unit (1113) performs IFFT on the inputted symbols, thereby outputting a baseband signal for data, which correspond to a time domain signal. The CP inserter (1114) duplicates (or copies) an end part of the baseband signal for the data and inserts the duplicated part to a front part of the baseband signal for the data. By performing CP insertion, Inter-Symbol Interference (ISI) and Inter-Carrier Interference (ICI) may be prevented, thereby allowing orthogonality to be maintained even in a multi-path channel.

Meanwhile, the receiver (112) includes a radio receiver (1121), a CP remover (1122), a Fast Fourier Transform (FFT) unit (1123), and an equalizer (1124). The radio receiver (1121), the CP remover (1122), and the FFT unit (1123) of the receiver (112) respectively perform the inverse functions of the radio transmitter (1115), the CP inserter (1114), and the IFFT unit (1113) of the transmitter (111). The receiver (112) may further include a demodulator.

What is claimed is:

1. A method for determining a transport block size (TBS), the method performed by a wireless device and comprising:
   determining a number of resource elements (REs) within a slot;
   calculating an intermediate value related to the TBS, based on the determined number of REs and a code rate;
   comparing the calculated intermediate value with a pre-determined threshold value; and
   determining the TBS based on the comparison,
   wherein based on that the calculated intermediate value is smaller than or equal to the pre-determined threshold value, the TBS is determined using a predetermined table,
   wherein based on that the calculated intermediate value is greater than the predetermined threshold value, the TBS is determined using a mathematical function,
   wherein the mathematical function includes parameters for the number of REs within the slot and the code rate, and
   wherein the mathematical function includes quantizing the calculated intermediate value.

2. The method of claim 1, wherein the mathematical function includes a ceiling function.

3. The method of claim 1, wherein the intermediate value related to the TBS is calculated in further consideration of a modulation order and a number of layers.

4. The method of claim 1, wherein the number of resource elements (REs) is determined except for REs for a reference signal.

5. The method of claim 1, wherein the TBS is used to transmit a physical uplink shared channel (PUSCH) or receive a physical downlink shared channel (PDSCH).

6. The method of claim 1, wherein the calculating of the intermediate value related to the TBS includes:
scaling the intermediate value related to the TBS with a scaling factor.

7. The method of claim 6, wherein the scaling factor is determined based on downlink control information (DCI).

8. The method of claim 7, wherein the DCI includes information on the scaling factor.

9. A wireless device for determining a transport block size (TBS), the wireless device comprising:
a transceiver; and
a processor configured to control the transceiver and to:
determine a number of resource elements (REs) within a slot;
calculate an intermediate value related to the TBS, based on the determined number of REs and a code rate;
compare the calculated intermediate value with a predetermined threshold value; and
determine the TBS based on the comparison,
wherein based on that the calculated intermediate value is smaller than or equal to the predetermined threshold value, the TBS is determined using a predetermined table,
wherein based on that the calculated intermediate value is greater than the predetermined threshold value, the TBS is determined using a mathematical function,
wherein the mathematical function includes parameters for the number of REs within the slot and the code rate, and
wherein the mathematical function includes quantizing the calculated intermediate value.

10. The wireless device of claim 9, wherein the mathematical function includes a ceiling function.

11. The wireless device of claim 9, wherein the intermediate value related to the TBS is calculated in further consideration of a modulation order and a number of layers.

12. The wireless device of claim 9, the number of resource elements (REs) is determined except for REs for a reference signal.

* * * * *